United States Patent
Hamamoto

(10) Patent No.: US 7,961,349 B2
(45) Date of Patent: Jun. 14, 2011

(54) INFORMATION PROCESSING APPARATUS AND PRINTER DRIVER

(75) Inventor: Akihiko Hamamoto, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1257 days.

(21) Appl. No.: 11/428,904

(22) Filed: Jul. 6, 2006

(65) Prior Publication Data

US 2007/0008554 A1    Jan. 11, 2007

(30) Foreign Application Priority Data

Jul. 8, 2005    (JP) ................................. 2005-199966

(51) Int. Cl.
*G06K 15/10* (2006.01)
*G06K 15/00* (2006.01)
*H04N 1/40* (2006.01)
*B41J 29/38* (2006.01)
*B41J 2/205* (2006.01)

(52) U.S. Cl. ...... 358/1.8; 358/1.16; 358/3.01; 358/3.06; 358/3.13; 358/3.23; 347/9; 347/10; 347/11; 347/12; 347/13; 347/14; 347/15

(58) Field of Classification Search .................. 358/1.8, 358/3.01, 3.06, 3.13, 3.23, 1.16, 426.05; 347/9–15

See application file for complete search history.

(56) References Cited

U.S. PATENT DOCUMENTS

| | | | |
|---|---|---|---|
| 5,471,563 A * | 11/1995 | Dennis et al. ................ | 358/1.15 |
| 6,097,499 A | 8/2000 | Casey et al. | |
| 6,538,764 B2 * | 3/2003 | Ueda ........................... | 358/1.16 |
| 6,896,345 B2 | 5/2005 | Nakayama et al. | |
| 6,896,348 B2 * | 5/2005 | Takekoshi et al. .............. | 347/15 |
| 6,913,337 B2 * | 7/2005 | Kuronuma et al. ............... | 347/9 |
| 2003/0193674 A1 * | 10/2003 | Kanda et al. .................. | 358/1.4 |
| 2004/0091042 A1 * | 5/2004 | Herath ......................... | 375/240 |
| 2004/0095603 A1 * | 5/2004 | Lin .............................. | 358/1.18 |
| 2004/0227965 A1 * | 11/2004 | Nakajima ..................... | 358/1.9 |
| 2005/0162694 A1 * | 7/2005 | Chiba et al. .................. | 358/1.15 |
| 2005/0275853 A1 * | 12/2005 | Ishizaka et al. ............... | 358/1.8 |

FOREIGN PATENT DOCUMENTS

| | | |
|---|---|---|
| JP | 11-259248 A | 9/1999 |
| JP | 2003-159839 A | 6/2003 |
| JP | 2003-305903 A | 10/2003 |
| JP | 2004-106496 A | 4/2004 |

* cited by examiner

*Primary Examiner* — Benny Q Tieu
*Assistant Examiner* — Mesfin Getaneh
(74) *Attorney, Agent, or Firm* — Canon U.S.A. Inc., I.P. Division

(57) ABSTRACT

An apparatus includes a buffer to store n lines of data divided into areas of column units. The apparatus obtains information of a column position corresponding to an end of an image to be printed with respect to a scanning direction of a print head. The apparatus reads data from the areas of the column units including the column position information and reduces the data to generate reduced data. The apparatus compresses the reduced data by using a pattern having n lines of data to generate first compressed data. Then, the apparatus compresses the first compressed data by k-bit units to generate second compressed data.

5 Claims, 13 Drawing Sheets

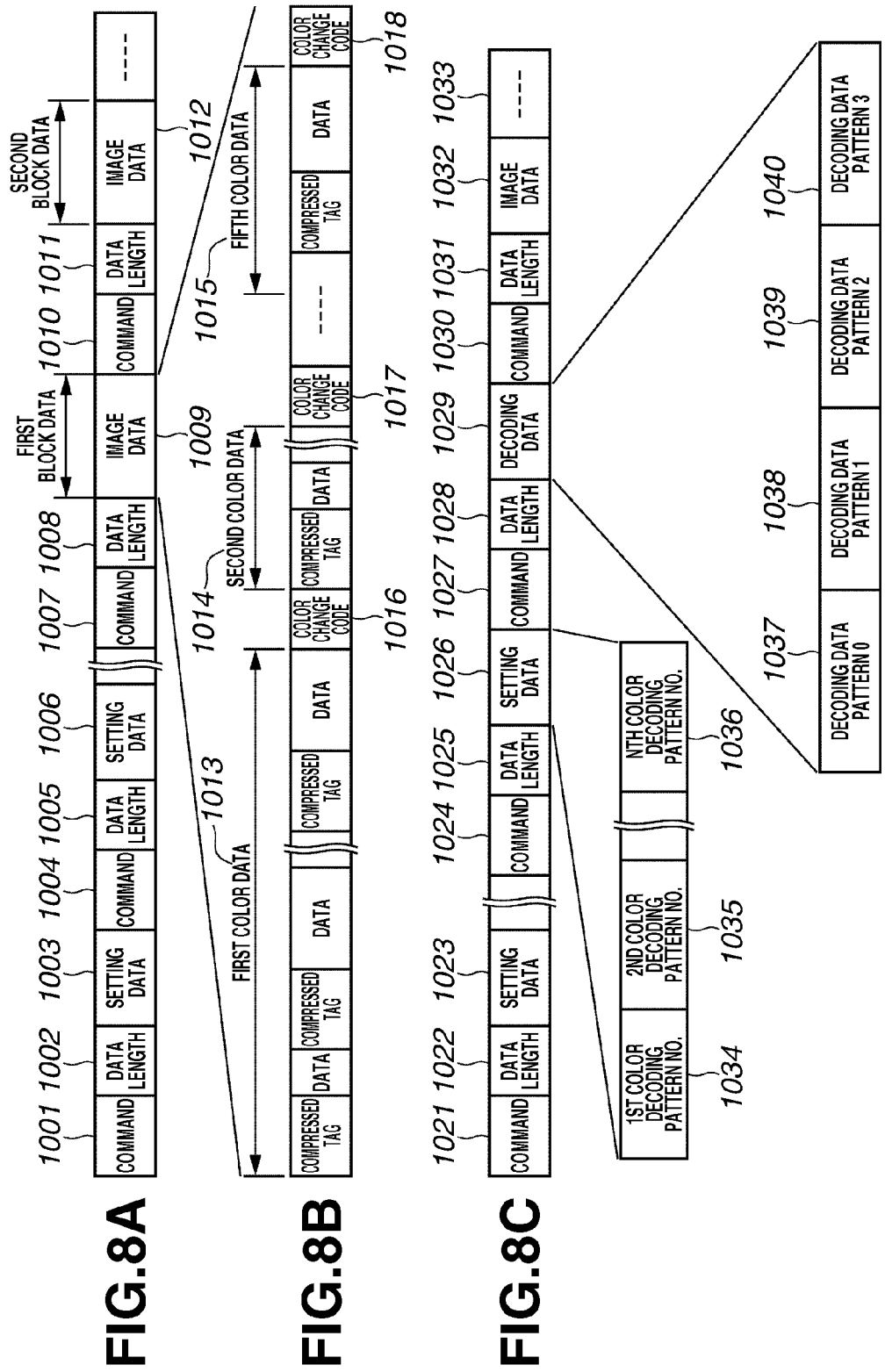

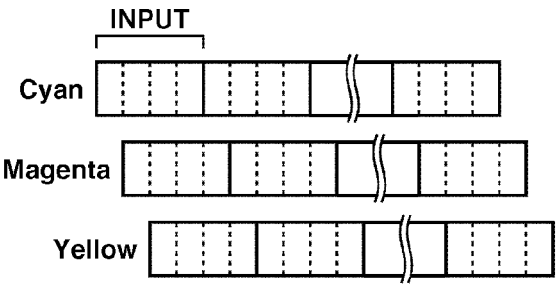
FIG.9A
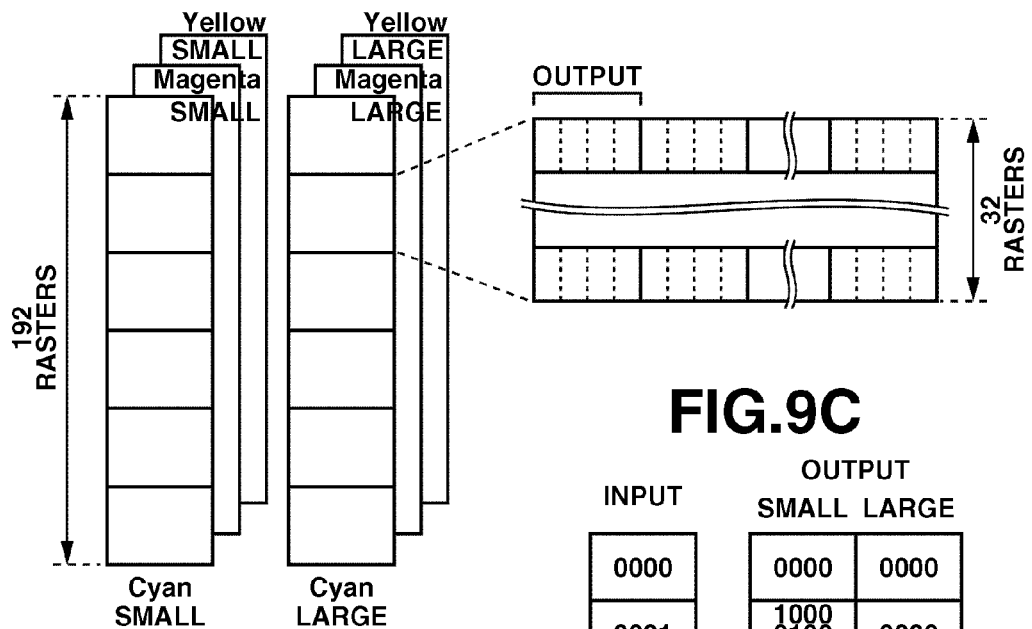
FIG.9B
FIG.9C
FIG.9D
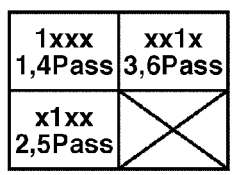

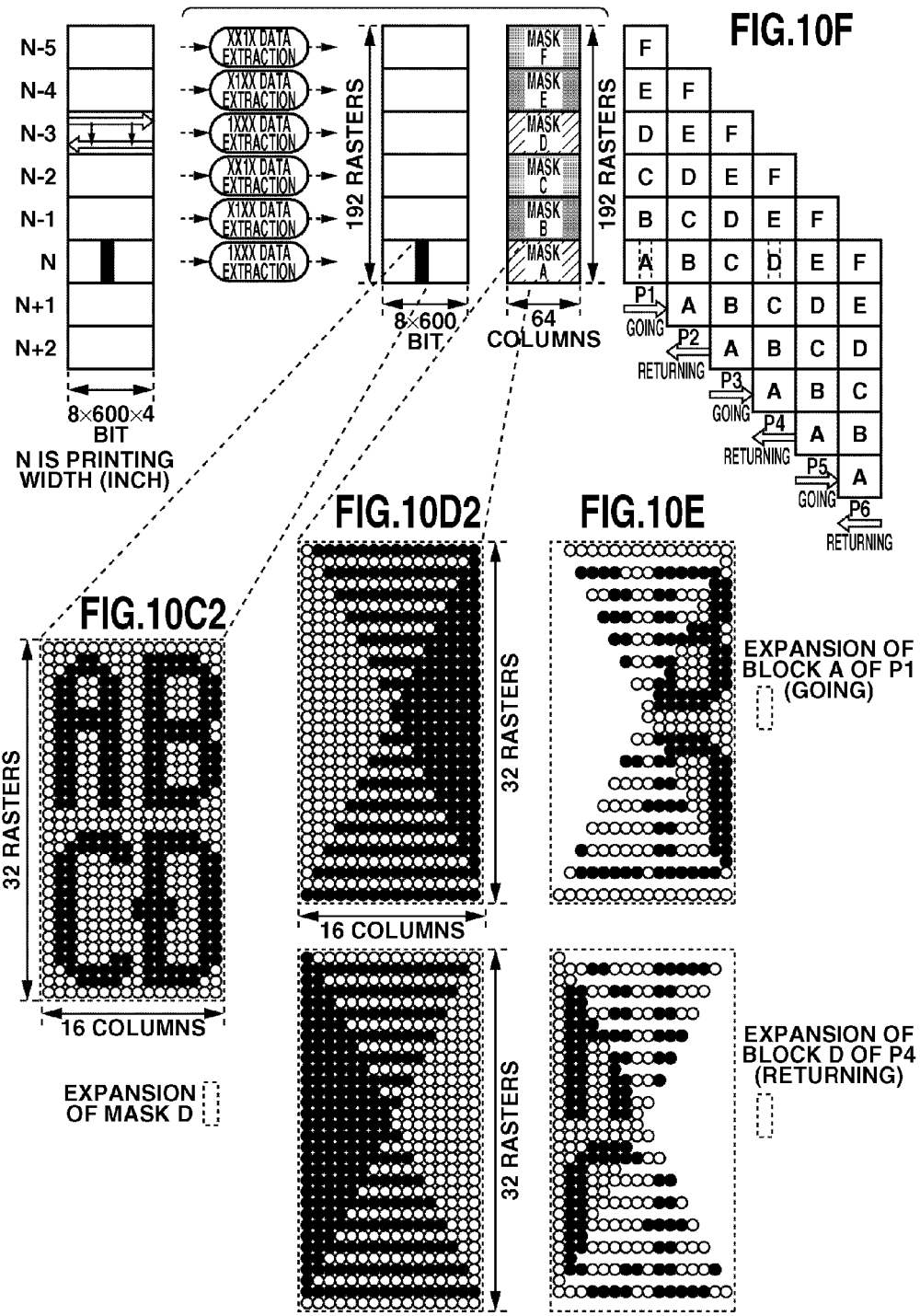

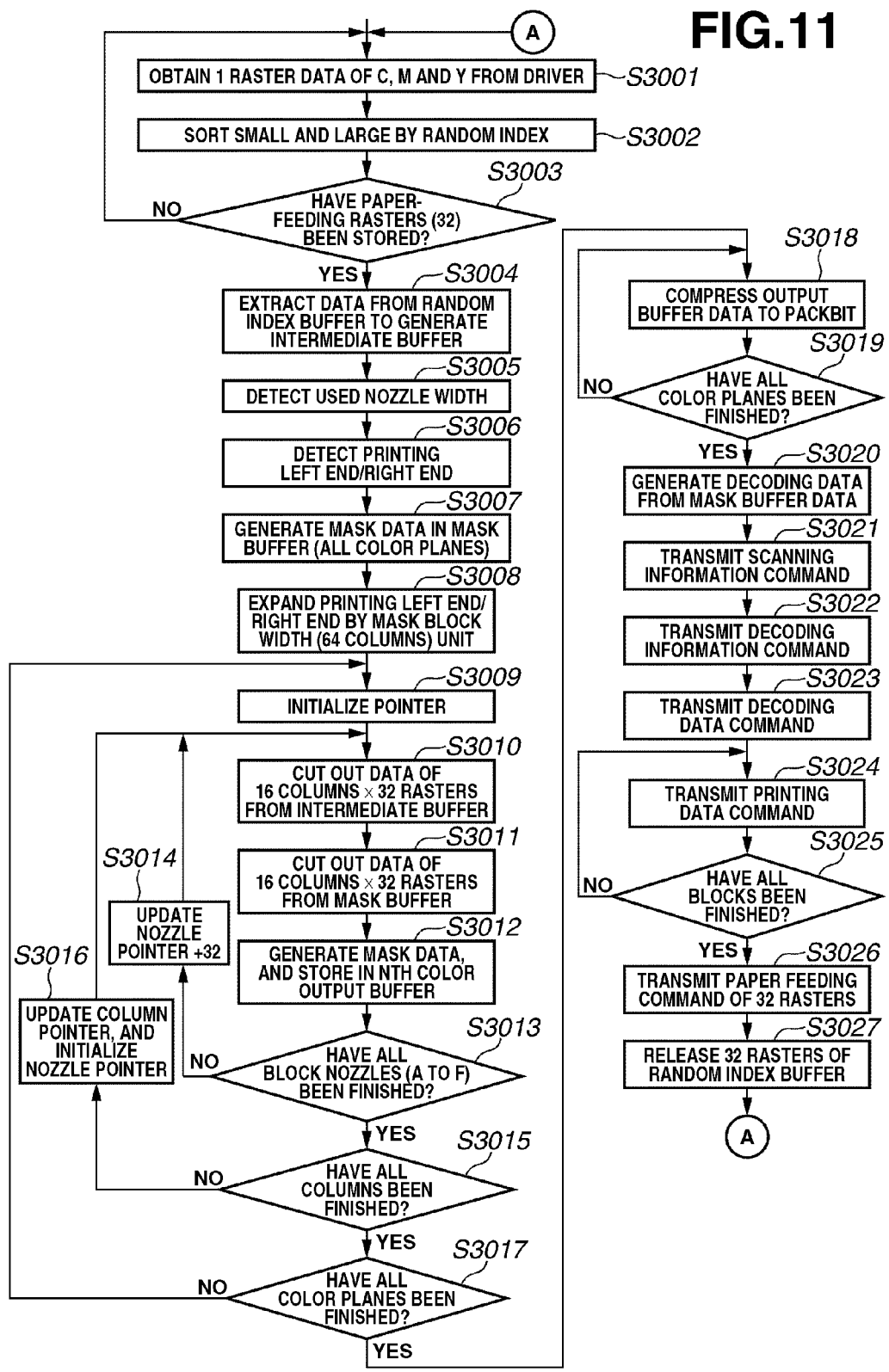

INFORMATION PROCESSING APPARATUS AND PRINTER DRIVER

BACKGROUND OF THE INVENTION

1. Field of the Invention

The present invention relates to an information processing apparatus, a printer driver, and a recording apparatus, and more particularly, to a printer driver of an information processing apparatus (e.g., host computer) capable of driving a recording apparatus (e.g., printer) with a limited printing buffer size.

2. Description of the Related Art

An ink jet recording apparatus of a serial type forms an image by moving a carriage having a recording head mounted thereon in a main scanning direction that is different from a paper feeding direction, and discharging inks from nozzles of the recording head.

Such recording apparatus typically includes a printing buffer (recording buffer) for holding recording data to be transferred to the recording head. As to a memory capacity of the printing buffer, an amount sufficient for holding all data to be recorded in at least one main scanning direction is typically provided (printing buffer of 1 band).

For example, when recording is carried out in an 8-inch width at resolution of 600 dpi in a main scanning direction and a recording head has 128 nozzles arranged at 600 dpi in a subscanning direction, a printing buffer necessary for one main scanning may require a memory capacity of 76800 bytes per color.

In order to realize high quality image, a multidroplet method is available. In the multidroplet method, plural amounts of each color ink are discharged while one kind of a discharge amount is conventionally permitted per color. Alternatively, a multicoloring method is available which adds photocyan (PC) and photomagenta (PM) to four basic colors of cyan (C), magenta (M), yellow (Y) and black (K) to improve a gray scale of a photo-image. Accordingly, a memory capacity necessary for the recording apparatus tends to increase.

Moreover, in order to realize high speed printing, attempts have continuously been made to reduce the number of scanning times necessary for printing one page by increasing the number of nozzles of each color. This also tends to increase a memory capacity of the printing buffer.

An increase in printing buffer size leads to a cost increase of a printer. However, in association with an increase in number of host apparatus (host computers) put into a market and a reduction in its price, there has been a trend of a rapid price reduction of ink jet recording apparatus in the market. Especially, a price reduction has been conspicuous in a low-end ink jet recording apparatus. To realize the price reduction, attempts have been made to reduce a memory size of an ink jet printer (e.g., reduce a printing buffer size).

For example, there has been a proposal to reduce a printing buffer size by controlling main scanning to start before data input of one main scanning amount is completed in a buffer (JP A 11-259248). There has also been a proposal to carry out a recovery control when data transfer from a host apparatus to a recording apparatus is not in time because of an increase in processing load or the like caused by multitask processing of a CPU in the host apparatus (JP A 2003-305903).

As another example, control is carried out for mask compression in a host apparatus, and information used for the mask compression, and compressed and thinned (reduced) print data are transferred from the host apparatus to a recoding apparatus (i.e., a printer) (JP A 2003-159839).

In the case of JP A 2003-159839, mask pattern data, and compressed and thinned data are sent in one column, and a mask pattern is a 1-dimensional mask along a nozzle column. Additionally, the mask pattern is shorter than one nozzle column, and is repeated a plurality of times with respect to the number of data corresponding to one nozzle column, and thus the method may achieve a cost advantage. However, there may be a problem associated with the method disclosed in JP A 2003-159839 in that flexibility of the mask pattern may be decreased and image quality may be sacrificed.

SUMMARY OF THE INVENTION

An embodiment of the present invention is directed to providing a recording apparatus capable of achieving high quality image and low cost while suppressing the amount of data transferred from a host apparatus to the recording apparatus.

According to an aspect of the present invention, an embodiment is directed to an information processing apparatus capable of connecting to a recording apparatus having a mode of scanning an area of a recording medium with a recording head a plurality of times, and executing recording to form an image. The information processing apparatus includes a buffer to store n lines of data divided into areas of column units, an obtaining unit configured to obtain information of a column position corresponding to an end of the image regarding a scanning direction of the recording head, and a reading unit configured to read data from the areas of the column units including the column position obtained by the obtaining unit. The information processing apparatus further includes a data reducing unit configured to reduce the data read by the reading unit to generate reduced data, and a first compression unit configured to compress the reduced data by using a pattern having n lines of data. Each line includes data which is an integral multiple of m-bit. The information processing apparatus further includes a second compression unit configured to compress the data compressed by the first compression unit by k-bit units in order to generate second compressed data, and an output unit configured to output the second compressed data.

According to another aspect of the present invention, an embodiment is directed to a printer driver method operating in an information processing apparatus that is capable of connecting to a recording apparatus which scans an area of a recording medium with a recording head a plurality of times and executes recording to form an image. The method includes obtaining information of a column position corresponding to an end of an image regarding a scanning direction of the recording head based on data stored in a buffer. The buffer stores n lines of data divided into areas of a number of column units. The method further includes reading data from the areas of the column units including the column position from the buffer, reducing the data read from the buffer to generate reduced data, compressing the reduced data by using a pattern having n lines of data to generate first compressed data. Each line of the pattern includes data which is an integral multiple of m-bit. The method further includes compressing the first compressed data by k-bit units to generate second compressed data, and outputting the second compressed data.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments. It should be noted that the references to "an" or "one" embodiment of this disclosure are not necessarily directed to the same embodiment, and such references mean at least one.

FIGS. 8A to 8C are diagrams showing structures of received data according to an exemplary embodiment of the present invention.

FIGS. 9A to 9D are explanatory diagrams of level conversion and a random index buffer according to an exemplary embodiment of the present invention.

FIGS. 10A to 10F are explanatory diagrams of mask compression and pass control according to an exemplary embodiment of the present invention.

FIG. 11 is a flowchart showing a control flow of an output module according to an exemplary embodiment of the present invention.

DETAILED DESCRIPTION OF THE EXEMPLARY EMBODIMENTS

Figure 1:
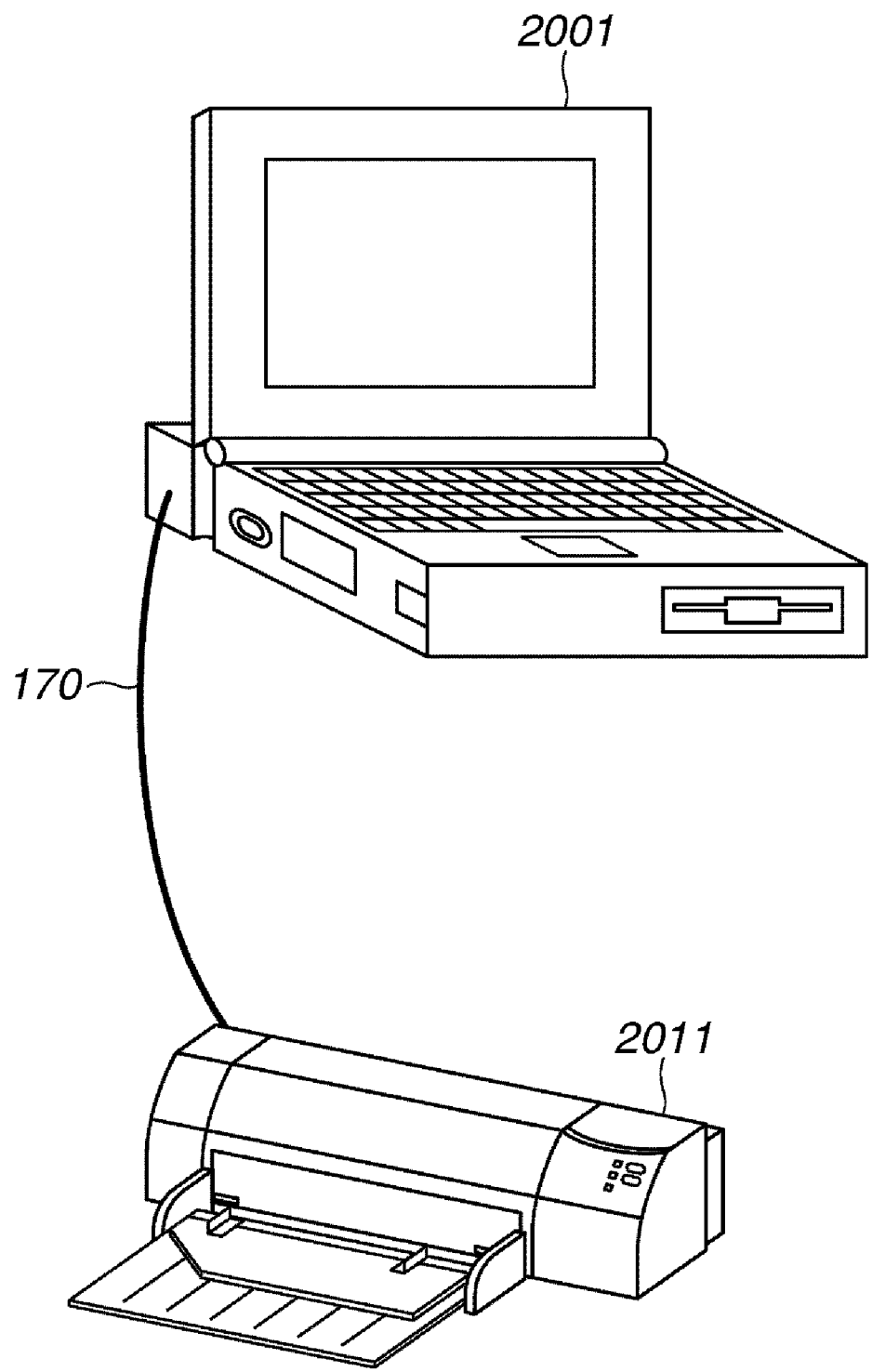
FIG. 1 is an external perspective view of a printing system according to an exemplary embodiment of the present invention.

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example, circuit patterns deposited on a substrate may be discussed, however these systems and the methods to fabricate these system as known by one of ordinary skill in the relevant art is intended to be part of the enabling disclosure herein where appropriate. Note that similar reference numerals and letters refer to similar items in the following figures, and thus once an item is defined in one figure, it may not be discussed for following figures.

Exemplary embodiments will be described in detail below in accordance with the accompanying drawings.

<Entire Configuration of Printing System>

FIG. 1 is an external view of a printing system according to a first exemplary embodiment described below. This system includes a host computer 2001, and an ink jet printer (ink jet recording apparatus) 2011 connected to the host computer 2001 via a serial interface 170.

Figure 2:
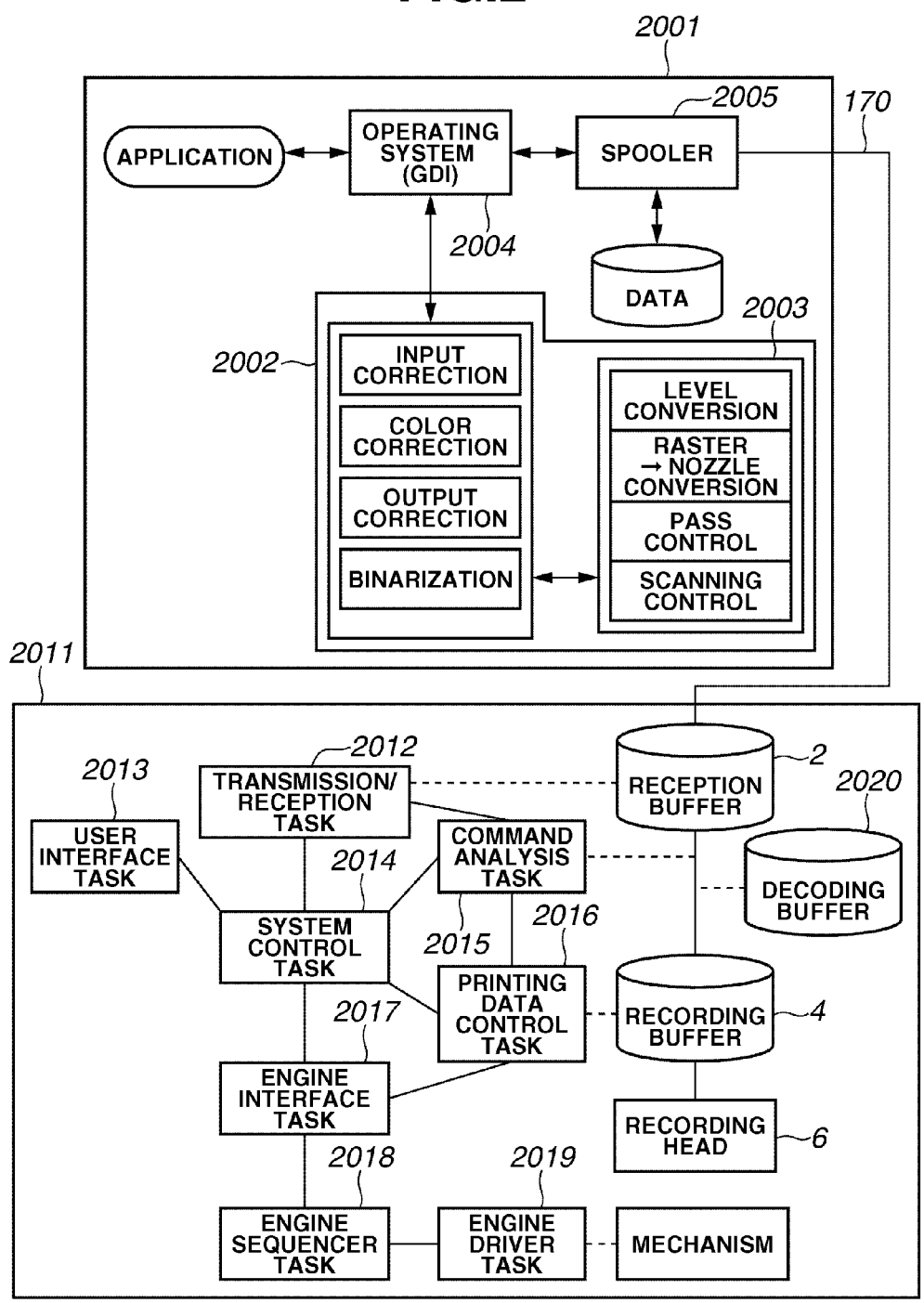
FIG. 2 is a functional block diagram of the printing system according to an exemplary embodiment of the present invention.

FIG. 2 is a functional block diagram of the printing system according to an exemplary embodiment of the present invention. In the host computer 2001, a printer driver 2002 obtains an image created by an application, i.e., data in an RGB form as color information and in a raster form as a data array, via a graphics driver interface (GDI) 2004 of an operating system.

The printer driver 2002 repeats execution of a process (input correction, color correction, output correction, binarization or the like) which is nondependent on model characteristics of the ink jet printer 2011, and execution of a process which is dependent on the model characteristics, by raster units. Thus, data is generated which is transmitted to the ink jet printer 2011. Especially, the process dependent on the model characteristics is executed by an output module 2003 which is one of constitutional modules of the printer driver 2002.

In the output module 2003, a conventional level conversion process is executed. In addition, raster/nozzle conversion (HV conversion) for converting data from a raster date form of YMCK to a form matched with a nozzle layout as described later, printing pass control combining generation of recording data (printing data) and paper feeding control, and scanning control for detecting a printing left end/right end of each scanning are executed on the output module 2003 side. These conversion and control have been conventionally executed on the printer side.

Accordingly, it is possible to simplify a control circuit of the ink jet printer and software executed therein, which contributes to realization of a low-cost ink jet printer.

The printing data generated by the host computer 2001 is transmitted to the ink jet printer 2011 via a spooler block 2005 and the serial interface 170.

In the ink jet printer 2011, data reception of a reception buffer 2 is controlled by a transmission/reception task 2012. A command stored in the reception buffer 2 is analyzed by a command analysis task 2015 to execute control according to a command type. In the case of a mechanical operation related command such as a paper feeding command, an ejecting command, a paper sending command, a mechanical operation is realized by an engine interface task 2017 which is an interface between a mechanical control system and an upper layer, an engine sequencer task 2018 for controlling a mechanical sequence, and an engine driver task 2019 for controlling input/output of a mechanical unit such as a sensor or a motor.

When a command is determined to be a decoding command described below by the command analysis task 2015, direct memory access (DMA) transfer is executed from the reception buffer 2 to a decoding buffer 2020. When a command is determined to be a printing information command (printing left end/right end, block size, number of blocks, number of color planes, or the like) by the command analysis task 2015, the information is transmitted to a printing data control task 2016. When an analyzing result of the command analysis task 2015 is a printing data command, DMA (direct memory access) transfer of printing data from the reception buffer 2 to a recording buffer 4 is started by the command analysis task 2015. In the DMA transfer, printing data of one block (equal to 64 columns) is transferred. Together with the start of the transfer, in synchronization with DMA transfer end interruption for transferring, a scanning start is instructed from the printing data control task 2016 to the engine interface task 2017.

At the engine interface task 2017, various registers for printing within an application specific integrated circuit (ASIC, i.e., gate array) 174 (FIG. 4) are set, and then a carriage is moved (scanning with recording head) to perform printing using the engine sequencer task 2018 and the engine driver task 2019. When the carriage reaches a predetermined encoder position, based on set values of the printing related registers, the ASIC 174 executes DMA transfer from the recording buffer to the recording head and drive control of the recording head is performed. Inks are discharged from the recording head to form an image of one scanning amount on recording sheet (recording medium).

Other tasks include a user interface task 2013 that detects an input system such as a cover switch for detecting cover opening/closing, a power key or a resume key operated by a user, and a system control task 2014 that adjusts an operation between the tasks.

<Configuration of Recording Apparatus>

Figure 3:
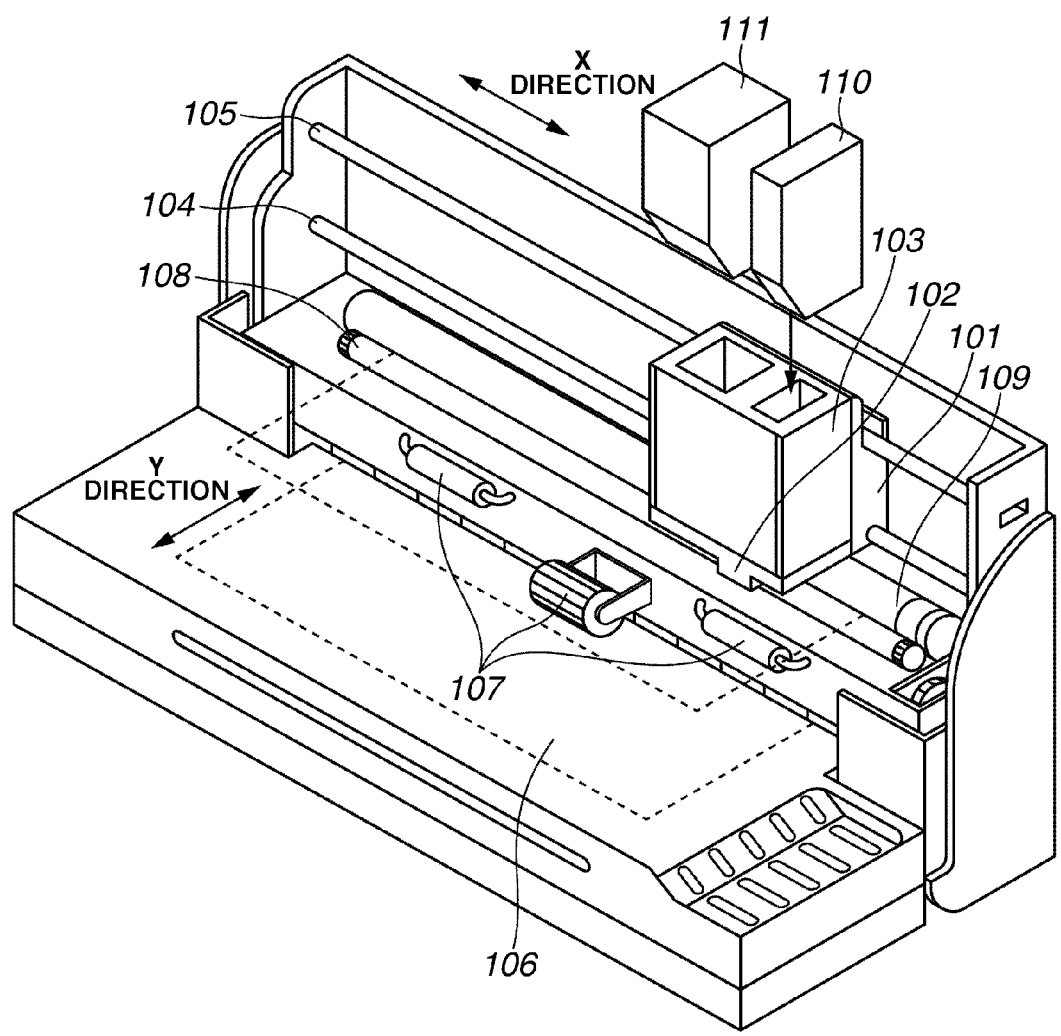
FIG. 3 is an external perspective view of a recording apparatus according to an exemplary embodiment of the present invention.

FIG. 3 is an external perspective view of a mechanical configuration of the ink jet printer 2011 according to an embodiment of the present invention. The ink jet printer 2011 is configured to be capable of both color printing and black and white mono-color printing. As shown in FIG. 3, a recording head 102 of a multinozzle type having 320 nozzles for black and 192 nozzles for each color, and a cartridge guide 103 are mounted on a carriage 101. The recording head 102 discharges an ink of black (K), or inks of cyan (C), magenta (M) and yellow (Y). When a printer is in operation, an ink cartridge 110 containing a black ink, and an ink cartridge 111 containing three other inks are attached to the recording head 102.

The inks of cyan (C), magenta (M), yellow (Y) and black (K) are supplied from the ink cartridges 110 and 111 to the recording head 102. A driving signal is supplied to each nozzle of the recording head 102 via a flexible cable (not shown) that has many conducting wires arranged therein.

Figure 7A:
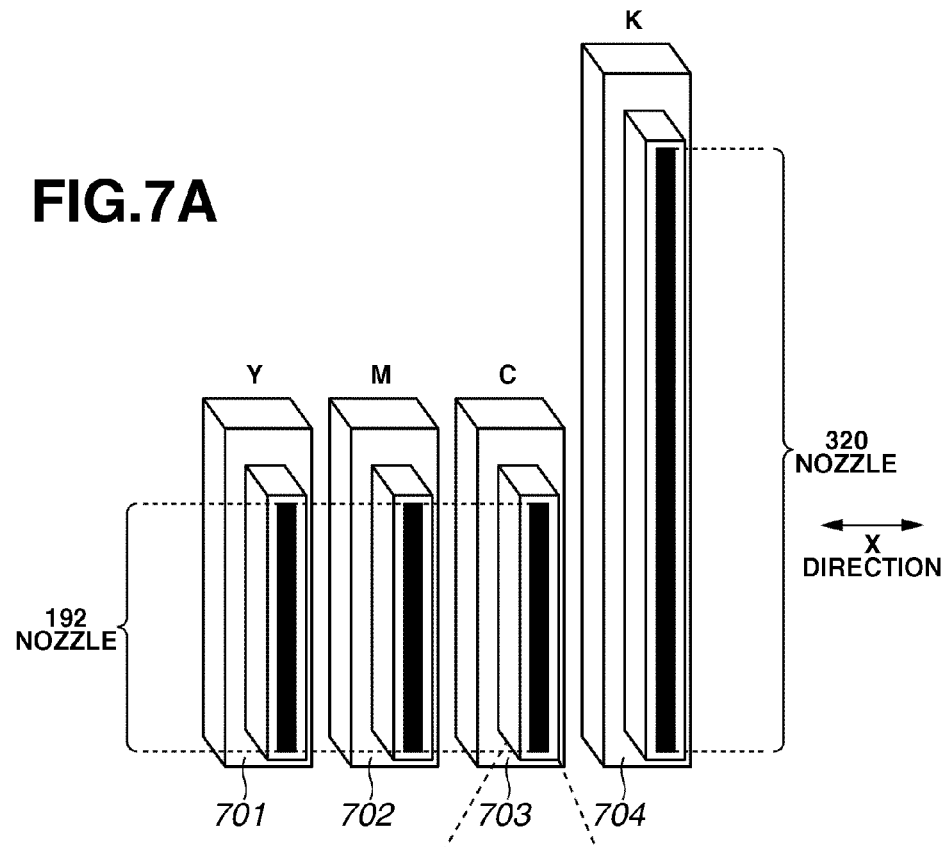
FIGS. 7A and 7B are external perspective diagrams of a recording head according to an exemplary embodiment of the present invention.
Figure 7B:
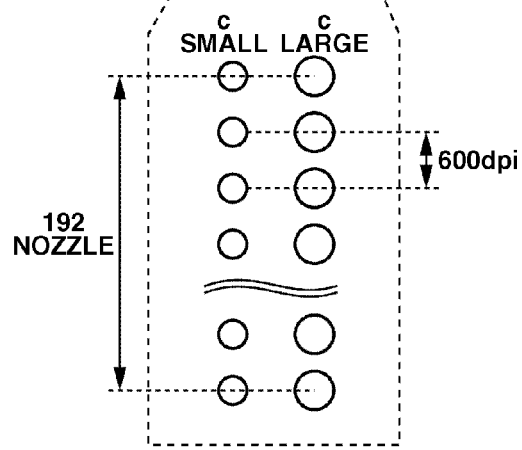

FIG. 7A is an external perspective view of the recording head 102 for color printing seen from a recording medium 196 side, according to an embodiment of the present invention. A row (array) of nozzles corresponding to the respective colors (yellow (Y) 701, magenta (M) 702, cyan (C) 703, and black (K) 704) are arranged in a direction roughly orthogonal to a scanning direction (X direction). As shown in a cyan nozzle layout of FIG. 7B, each color nozzle of yellow, magenta, and cyan has a structure where small and large nozzles are each arranged in parallel by 192. Accordingly, for colors, totally 1152 nozzles (192 nozzles×6 planes (yellow large/small, magenta large/small, and cyan large/small) are arranged, and the small and large nozzles are treated as different color planes for the purpose of control.

The carriage 101 is mounted on two guide rails 104 and 105, and an endless belt 109 connected to the carriage 101 is driven by a carrier motor (line feed motor) (described below) to reciprocate the carriage 101 for scanning in an X direction (hereinafter referred to as "main scanning direction"). A convey (line feed) roller 108 is driven by a carrier motor (line feed motor) (described below) to convey (feed) the recording medium 106 in a Y direction (hereinafter referred to as "subscanning direction").

Encoder slits (not shown) are arranged in parallel with the guide rails 104 and 105. A sensor (not shown) mounted on the carriage 101 reads the number of encoder slits to capture (detect) a position in a scanning direction, and a position of the carriage 101 is controlled by one pixel unit based on this positional information.

Figure 4:
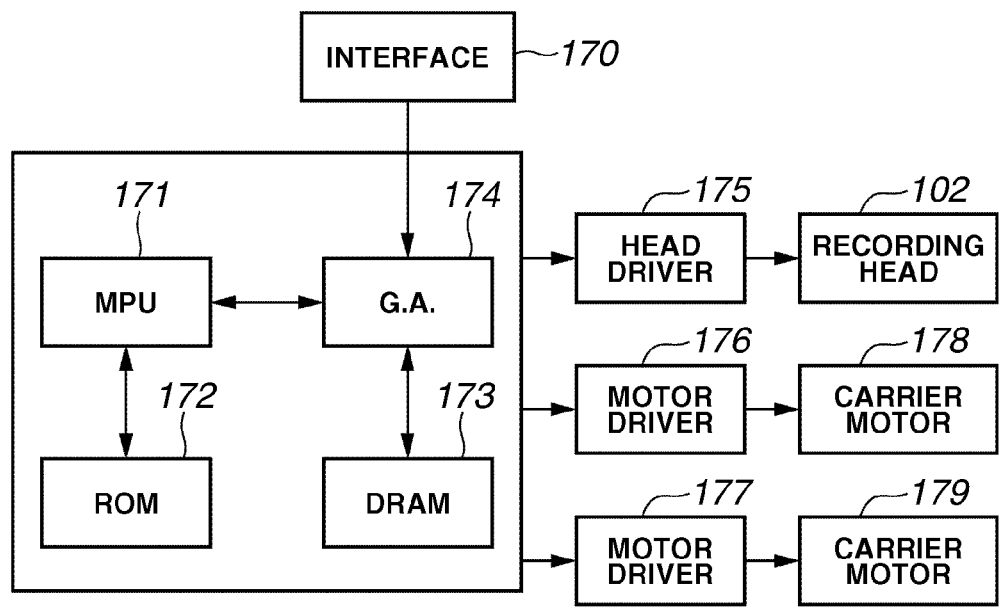
FIG. 4 is a control block diagram of the recording apparatus according to an exemplary embodiment of the present invention.

FIG. 4 is a block diagram showing a control circuit of the ink jet printer according to an embodiment of the present invention. In FIG. 4, numeral 170 denotes an interface for receiving a recording signal, e.g., recording data from an external apparatus such as the host computer 2001. numeral 171 denotes an MPU, numeral 172 denotes a ROM for storing a control program (including character font when necessary) executable by the MPU 171, and numeral 173 denotes a DRAM for temporarily storing various data (the recording data, data supplied to the head, and the like).

The ASIC 174 (i.e., gate array) controls recording of the recording head 102, and also controls data transfer among the interface 170, the MPU 171 and the DRAM 173. Numeral 179 denotes a carrier motor (line feed motor) for moving the recording head 102 in the main scanning direction, and numeral 178 denotes a convey (line feed) motor for convey (feed) the recording medium in the subscanning direction. Numeral 175 denotes a head driver for driving the recording head 102, and numerals 176 and 177 denote motor drivers for driving the convey motor 178 and carrier motor (line feed motor) 179 respectively.

An outline of an operation of the control circuit will be described. When the recording data is entered through the interface 170, the data is converted into driving data by the ASIC 174 and the MPU 171. When the motor drivers 176 and 177 are driven, a recording element of the recording head 102 is driven based on the driving data and a control signal sent to the head driver 175 to discharge inks.

<Data Flow in Recording Apparatus>

Figure 5:
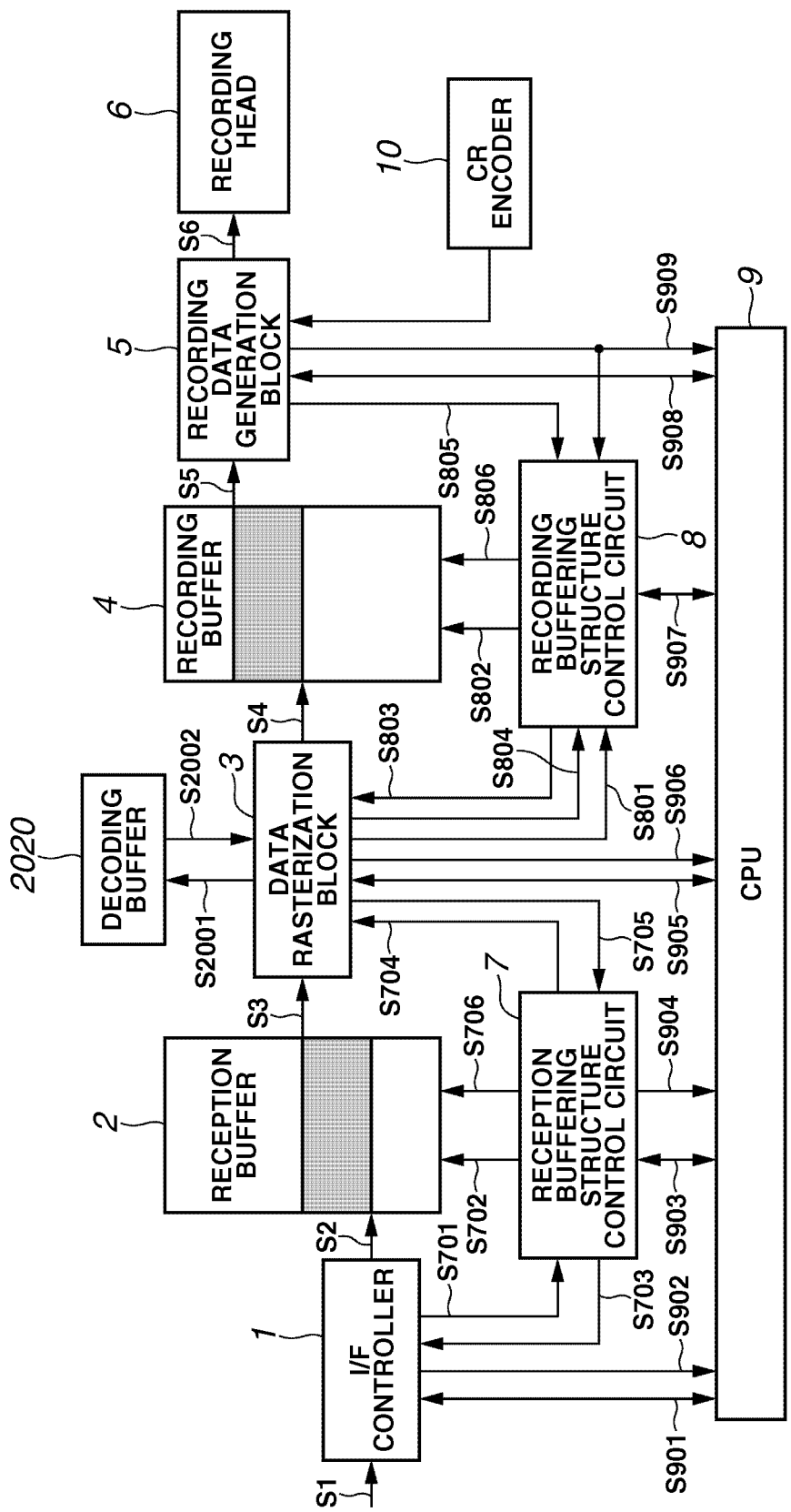
FIG. 5 is a functional block diagram of the recording apparatus according to an exemplary embodiment of the present invention.

FIG. 5 is a block diagram showing a recording control unit of the printer 2011 in the printing system according to an exemplary embodiment of the present invention. An interface control unit (controller) 1 receives data transferred from the host computer 2001 via an interface signal line S1, and extracts image date and data necessary for a recording operation from among the received data. The data extracted by the interface controller (I/F controller) 1 are stored in the reception buffer 2 via a signal line S2. the signal line S is the interface 170. the CPU9 is MPU171.

The reception buffer 2 is disposed in a memory unit (storage device) such as an SRAM or a DRAM, and data stored in the reception buffer 2 have structures as shown in FIGS. 8A to 8C.

As shown in a data structure of the reception buffer 2 of FIG. 8A, data of "COMMAND" (1001), "DATA LENGTH" (1002), and "SETTING DATA" (1003) are stored from the left in order, and subsequently data of "COMMAND" (1004), "DATA LENGTH" (1005), and "SETTING DATA" (1006) are stored.

This structure shows that data transferred in a time series fashion are stored in sequential addresses of the reception buffer 2. The setting data 1006 shown here is information indicating, e.g., execution of paper feeding, setting of a paper feeding amount, the number of recording heads to be used, or the like. Recording can be executed only after all bits of information defined by the setting data are obtained. Subsequently, image data (1009, and 1012) to be recorded are stored in the reception buffer 2.

The image data (1009 and 1012) are obtained dividing a necessary data amount when the recording head executes recording on the recording medium by one scanning. That is, the data amount is divided into block units of smaller data amounts. The image data are divided into the block units to be sequentially stored as first block data (1009), second block data (1012), . . . . These block data are stored in block units also in the recording buffer 4.

FIG. 8B shows the data structure of the image data divided by the block units according to an exemplary embodiment of the present invention. As shown in FIG. 8B, data of plural colors (1013 to 1015) are sequentially stored as compressed data. These color data are separated by "COLOR CHANGE CODES" (1016, 1017, and 1018).

For example, in the case where a printing mode (recording mode) is that applicable to plain paper, four colors of cyan, yellow, magenta and black are used, and only large nozzles are employed for colors, compressed data of first to fourth colors constitute one data block.

Besides, there is a printing mode (recording mode) which is one of the modes applicable to special paper and which forms an image by three dye colors of cyan, yellow and magenta without using a pigment color of black which is difficult to fix on the special paper. In this case, grainy effects can be reduced by using small nozzles in addition to the large nozzles. In other words, two rows (arrays) of nozzles (large and small nozzles), one row (array) having 192 vertical nozzles for each of three colors of cyan, yellow and magenta, are disposed corresponding to cyan, yellow, and magenta.

That is, compressed data of first to sixth colors constitute one block data. For example, the first and second colors correspond to data of cyan, the third and fourth colors to data of magenta, and the fifth and sixth colors to data of yellow.

FIG. 8C shows a data structure stored in the reception buffer regarding one scan-printing in the case of a printing mode to which mask compression described below is applied in the output module, according to an exemplary embodiment of the present invention. FIG. 8A shows the case of the data structure where no mask compressing is applied. A difference in FIG. 8C from FIG. 8A is that two types of commands, i.e., decoding information commands (1024 to 1026) and decoding data commands (1027 to 1029), are added between scanning information commands (1021 to 1023) indicating printing left and right end positions of the scanning, and printing image data commands (1030 to 1032) of the first block. The decoding information commands and decoding data commands are for transmitting information necessary for decoding the image data subjected to mask compression in the output module on the ink jet printer side.

The decoding information command designates a decoding pattern to be used for decoding each color in a printing image data command. According to the exemplary embodiment, the decoding data command is decoding data itself that supports four patterns at the maximum. The decoding data is data used during the mask compression executed in the output module. The data used for the mask compression is different between forward-direction printing (scanning from carriage reference position to nonreference position), and backward-direction printing (scanning from non reference position to reference position). A detail of the data used for the mask compression will be described below regarding the mask compression in the output module. Thus, in the output module, a decoding information command and a decoding data command are generated for each scanning.

Figure 6:
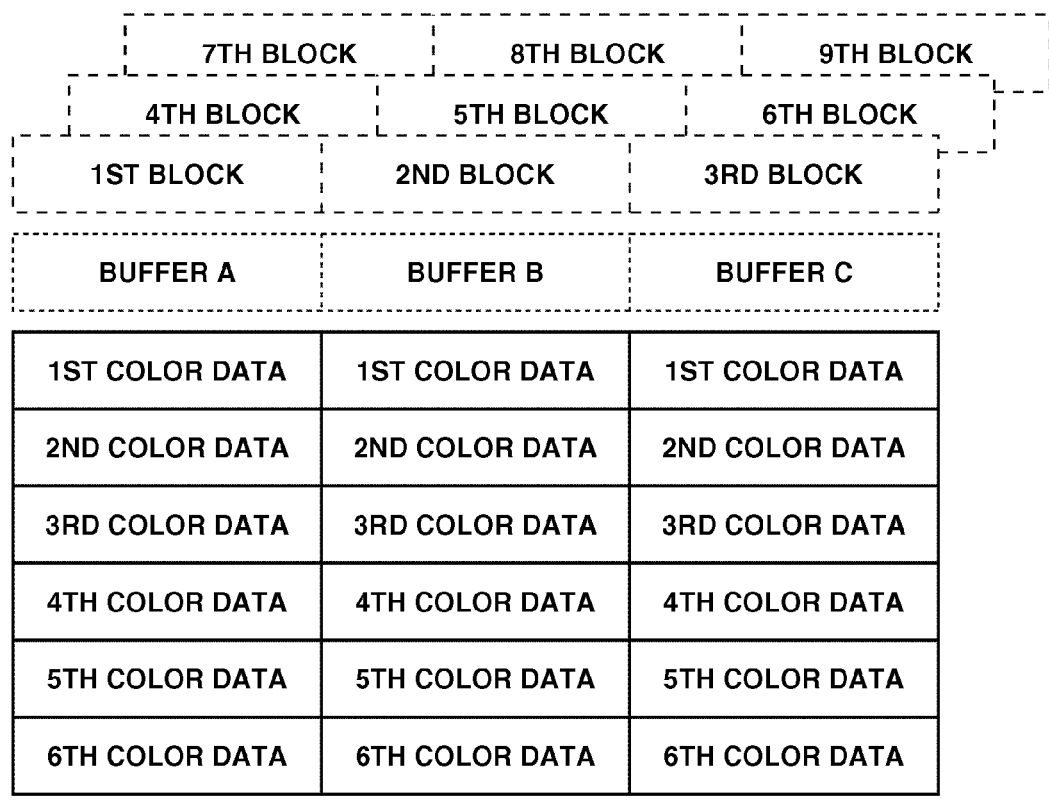
FIG. 6 is a diagram showing a data structure of a recording buffer according to an exemplary embodiment of the present invention.

Though the explanation of the control block of the recording apparatus is yet to be finished, the recording buffer 4 will be described. FIG. 6 shows a data structure of the recording buffer 4 for holding image data according to an exemplary embodiment of the present invention. According to the exemplary embodiment, the number of columns is 64 (600 DPI) for one block, and the recording buffer 4 employs a ring buffer structure.

For example, in the case of a mode applied to special paper and using both large and small nozzles of Y, M and C, first to sixth color data are stored in block data. A length of color data stored in each block corresponds to the number of nozzles of the recording head. As a size of the recording buffer 4, an amount equal to 3 blocks of maximum usable color planes is allocated, and the maximum usable number of color planes is 6 according to the exemplary embodiment. The number 6 indicates one of modes used in the case of special paper printing in which first to sixth color data are stored. Thus, for the size of the recording buffer 4, 27648 bytes (192 nozzles× 64 columns×6 color planes÷8×3) are allocated in the DRAM 173.

For example, when a length of about 8 inches at the maximum is recorded in one scanning in the printing mode using the six color planes, the three blocks can be simultaneously held as above described. A buffer A is allocated to the first block, a buffer B is allocated to the second block, and a buffer C is allocated to the third block. When reading (printing) of the first block from the buffer A is finished, data of the fourth block is written in the buffer A. When reading of the second block from the buffer B is finished, data of the fifth block is written in the buffer B. After repeating such reading and writing (ring buffer process), data of the 75th block (8 inches× 600 DPI÷64 columns) is written in the buffer C at the end. Accordingly, the recording buffer 4 is configured to execute reading in parallel with writing by managing writing and reading pointers described below. With this configuration, one scan-printing can be carried out even when a capacity of the recording buffer 4 is far below a width of one scanning equal to 64 columns×3 blocks.

In the other case of using only one color, for example, data of 18 blocks can be simultaneously held. In this case, however, a printing buffer size is 1.92 inches in printing width, that is far below 8 inches of a maximum printing width.

Returning to FIG. 5, the explanation of each control block will be continued. Among the data stored in the reception buffer 2, "COMMAND", "DATA LENGTH", and "SETTING DATA" which are setting values for controlling the recording apparatus, are read from the I/F controller 1 via the signal line S902 by the CPU 9 and are set in the control circuits 7 and 8 (S903, and S907). The CPU 9 interprets the read data (corresponding to data 1001 to 1008 of FIG. 8A), and executes overall recording control of the printer 2011 according to its result.

Regarding a process of the image data, the CPU 9 activates a data rasterization block 3 to execute the process.

The data rasterization block 3 has a decoding data downloading function, a decompression function (expansion function) for decompressing packbits, and a mask decompression function (mask expansion function) for decompressing the data after the decompression of the packbits based on the decoding data.

Thus, the data rasterization block 3 executes a double (two-stage) decompression process including the packbits decompression and the mask decompression. The decompression process of the packbits is called a packbits rasterization process, and the mask decompression is called mask rasterization in other expressions.

The packbits rasterization will be described which is carried out in the data rasterization block while no mask compression is executed as shown in FIGS. 8A and 8B. As shown in FIG. 8A, the data rasterization block 3 reads three types of data, i.e., "COMPRESSED TAG", "DATA" and "COLOR CHANGE CODE", from the reception buffer 2, and executes data rasterization control based on these data. When the compressed TAG takes an 8-bit value of 00h to 7Fh, a process is carried out presuming that there are 1 to 128 non-sequential data in a data area. When the compressed TAG is 8-bit data of FFh to 81h, a process of decompressing next 1-byte data from 2 data to 128 data which are sequential, is carried out. When a value of 80h is read at the compressed TAG, the data is processed as a color change code. The decompressed data is carried through the signal line S4 to be written in the recording buffer 4.

The decompressed image data is stored in the recording buffer 4 as shown in FIG. 6. Head data of the data corresponding to the first color of the first block is written (stored) at a head (top, initial) address of the recording buffer 4. Subsequent data are sequentially written while one address is added to each address. An area to be stored in the recording buffer 4 is decided based on setting data first read by the CPU 9, and data exceeding the value of the setting data are inhibited to be written. Accordingly, when the image data is compressed, a limitation is imposed by a data size according to the setting data. Data after detection of a color change code are sequentially written from a head address (top address, initial address) of data corresponding to the second color. This address data is controlled by a recording buffering structure control circuit 8 described below.

This writing process is carried out from the first to six color data. When the writing of the six color data is finished and a color change code is detected, all the data of the first block have been written. When the data rasterization block 3 finishes a data rasterization operation, the data rasterization block 3 notifies completion of data rasterization of one block to the CPU 9 through interruption (INT 1) and waits for a start of next data rasterization from the CPU 9.

When image data of a plurality of blocks are stored in the recording buffer 4, the CPU 9 operates the carrier motor (line feed motor) 179 to start a recording operation. Scanning and recording are carried out with the recording head 6 to form an image on paper (recording medium). A movement of the recording head 6 is accompanied by output of a signal from an encoder (CR encoder) 10. After the recording head 6 performs scanning in the main scanning direction, the convey unit convey the recording medium in the subscanning direction. Thus, an image of one page is recorded by repeating scanning with the recording head and carrying the recording medium.

The recording data generation block 5 reads the recording data from the recording buffer 4 via the signal line S5 based on a value designated by the CPU 9 in a timing synchronized with the CR encoder 10, and outputs the data to the signal line S6 while converting them into data structures to be recorded by the recording head 6 (102). The recording data generation block 5 holds information of a block width (block length) in the recording buffer described below, and information about a height ("number of rasters" of color data) of each color of the block.

Next, the decoding data downloading function applied to decoding data commands (1027 to 1029) of FIG. 8C will be described. The data rasterization block 3 reads the decoding data command (1027) and a data length (1028) from the reception buffer 2, carries decoding data fetched via the signal line S3 through the signal line S2001 without rasterizing or decompressing it, and transfers the data by DMA to the decoding buffer 2020 allocated to a part of the DRAM 173. According to the exemplary embodiment, decoding data of four patterns 0 to 3 are stored, and an area of 1536 bytes (192 vertical rasters×64 horizontal columns÷8) per pattern is allocated.

Lastly, mask rasterization will be described, which is executed at the data rasterization block when a decoding information command (1024) is detected between the scanning information command (1021) and the printing data command (1030).

The CPU 9 establishes a decoding pattern number applied to data corresponding to each color based on a parameter (1026) of the decoding information command (1024) before packbits rasterization is started. The CPU 9 sets validity of a mask rasterization function, decode pattern number to be applied to each color data, and offset information, in a mask rasterization register group (not shown) of the data rasterization block via the signal line S905.

Each decoding pattern is 2-dimensional data of 192 rasters×64 columns, and the offset information designates a position to start decoding. Subsequently, as in the case of the packbits rasterization, the CPU 9 starts the packbits rasterization by the data rasterization block via the signal line S905. The data rasterization block 3 fetches the image data of the reception buffer via the signal line S3 to execute the packbits rasterization. Simultaneously, the data rasterization block 3 fetches decoding data corresponding to this data from the decoding buffer 2020 via the signal line S2002, and restores data before mask compression, from both the data after the packbits rasterization and the decoding data. Then, the data rasterization block 3 stores the recording data in the recording buffer 4 via the signal line S4.

<Writing/Reading Control of Reception Buffer>

The interface controller 1 writes the data into the reception buffer 2, and the data rasterization block 3 reads only the image data. However, it is a reception buffering structure control circuit 7 that controls its writing and reading addresses. The reception buffering structure control circuit 7 manages head (top) and last (end) addresses (initial and end addresses) of the reception buffer 2, and writing and reading addresses.

The reception buffering structure control circuit 7 increments by one address each time a writing request signal is received from the interface controller (S701), and outputs it as information of a writing address to the reception buffer 2 (signal line S702). The reception buffering structure control circuit 7 returns the writing address to the head (initial) address of the reception buffer 2 when the last (end) address of the reception buffer is reached.

The reading address is output to the reception buffer incrementing by one address via the signal line S706 when the CPU 9 directly reads the data from the reception buffer 2 via a data reading register of the reception buffering structure control circuit 7, and when the data rasterization block 3 makes a request via the data reading request signal line S705.

The reception buffering structure control circuit 7 returns the reading address to the head address (top address, initial address) of the reception buffer 2 when the reading address reaches the last (end) address.

The process of the data writing/reading control to the reception buffer 2 has been described above. Next, a process will be described in which the data read from the reception buffer 2 and subjected to rasterization in the recording buffer 4 is written to the recording buffer 4, or the data is read from the recording buffer 4.

<Writing/Reading Control of Recording Buffer 4>

The data rasterization block 3 writes the image data into the recording buffer 4, and the recording data generation block 5 reads the written image data. In the process, it is a recording buffering control circuit 8 that controls writing and reading addresses.

The recording buffering structure control circuit 8 manages head and last addresses of the recording buffer, and the writing and reading addresses.

The recording buffering structure control circuit 8 increments by one address each time a writing request signal is received from the data rasterization block 3 (S801), and outputs the signal as writing address information to the recording buffer 4 (signal line S802). Then, when a last address (end address) of the recording buffer 4 is reached, the recording buffering structure control circuit 8 returns the writing address to the head address (top address, initial address) of the recording buffer 4.

Moreover, when the writing address reaches (coincides with) a reading address, the recording buffering structure control circuit 8 communicates to the data rasterization block 3 via the signal line S803 that next image data cannot be written because the recording buffer 4 is filled with image data.

Further, when a color change code is read from the reception buffer 2, the data rasterization block 3 communicates to the recording buffering structure control circuit 8 via the signal line S804. The recording buffering structure control circuit 8 prepares to output a head address (top address, initial address) for storing next color data through the signal line S802. A structure of the recording buffer 4 can be set up in a manner that the CPU 9 writes data in the internal register using a bus of the signal line S907.

When the recording data generation block 5 sends the recording buffering structure control circuit 8 a data reading request via the signal line S805 for each color, one address is added as a reading address to the reading address via the signal line S806, and the reading address is output to the recording buffer 4.

When the reading address reaches the last address (end address), the recording buffering structure control circuit 8 returns the reading address to the head address (top address, initial address) of the recording buffer 4.

The recording data generation block 5 sets up a data structure of an image data block being read, in a register within the recording data generation block 5, via the signal line S908 from the CPU 9. Upon reading of all image data from the set image data block structure, an end signal S909 is transmitted as an interruption signal to the CPU 9. At this stage, if a next image data block has been already rasterized in the recording buffer 4, its image data block structure is written in the register.

The recording buffer 4 controls data writing by image data block units, and the recording data generation block is not activated for an unwritten image data block. Thus, the reading addresses of the recording buffer never exceed the writing addresses.

The outline of the data flow in the recording apparatus has been described.

<Data Generation in Host Apparatus>

Referring to FIGS. 9A to 9D and FIG. 13, data generation in the output module, according to an exemplary embodiment, is described. The output module is one of the modules constituting the printer driver executed on the host apparatus side in the printing system of the exemplary embodiment.

A case where multipass recording (6 passes) is performed, will be described. In the case of the multipass recording, a predetermined area of a recording medium is scanned by the recording head a plurality of times (6 times) to record and form an image.

FIG. 11 shows control flow of the output module according to an exemplary embodiment of the present invention.

[Control Flow]

An output module 2003 obtains data in an amount equal to one raster of C, M and Y from a module other than a printer driver 2002 (S3001). In the case of a printing mode according to the present exemplary embodiment, as shown in FIGS. 9A and 9C, the data is delivered as information of 9 levels at 4 bits per pixel by resolution of 600 DPI. If 8 inch data that is a maximum printing width, is present, an information amount is 2400 bytes (8 inches×600 DPI×4÷8) per color.

As shown in an I/O output distribution table of FIG. 9C, with respect to input from the printer driver 2002, in the output module 2003, 4-bit outputs are distributed in combinations of large and small nozzles according to input values from 0 to 8 (S3002). In a case where three patterns are assumed for the same input value, random distribution based on random numbers is executed.

In the case of the printing mode according to the present exemplary embodiment, since printing is 6-pass printing in color, and there are 192 color nozzles, a paper feeding amount is 32 rasters. Thus, data in amount equal to one scanning is generated each time data of 32 rasters is stored in a random index buffer.

The processes of the steps S3001 and S3002 are carried out until the raster data of 32 rasters are stored (S3003).

When new data of 32 rasters are stored in the random index buffer, the process proceeds to generation of compressed data.

As a specific example, data generation for P1 recording of a 6-pass image in FIG. 10F will be described.

Data to be printed by scanning P1 is extracted from the random index buffer to generate an intermediate buffer (S3004).

As shown in FIG. 9D, 4 bits in the random index buffer are defined such that 1XXX is printed in 1 and 4 pass, X1XX is printed in 2 and 5 Pass, and XX1X is printed in 3 and 6 Pass.

In other words, in the P1 scanning of FIG. 10F, with respect to data to be printed at a nozzle block A, 1XXX (first bit of 4 bits) of an N block storing the subject 32 raster data in FIGS. 10A and 10B is extracted. Here, the nozzle block A corresponds to 32 nozzles counted from an upstream side of a nozzle row (array) in a carrying-direction.

Similarly, in the P1 scanning, with respect to data to be printed at a nozzle block B (32 nozzles after A), X1XX (second bit of 4 bits) of an (N−1) block storing previous 32 rasters is extracted.

Similarly thereafter, XX1X of an N−2 block is extracted for a nozzle block C. With respect to nozzle blocks D and F, extraction is similarly carried out using extraction patterns. The nozzle block F is 32 nozzles positioned in a downstream side (paper ejection side) of the nozzle row in a carrying-direction.

In other words, in the 6-pass conceptual drawing of FIG. 10F, intermediate buffer data respectively generated which are printed at the nozzle block of the going P1 pass and the nozzle block D of the returning P4 pass, are basically identical, but strictly, they differ from each other. That is, as described above in the recording data flow of the printer main body, the recording buffer on the printer main body side can simultaneously hold printing data of only 64 columns×3 blocks in the case of the 6 color plane mode.

Accordingly, as indicated by an arrow of FIG. 10A, a direction in which data is read from the random index buffer, corresponds to a scanning direction (forward printing (Fwd)/backward printing (Bwd). Thus, when a scanning direction of the recording head is changed, a reading direction of the random index buffer is controlled to change. The same holds true for data generation of the mask buffer.

The above is the case of one color plane. However, since there are large and small nozzles for three colors of Y, M and C, for totally 6 color planes, intermediate buffers are similarly generated from the random index buffer.

Intermediate buffers of all the color planes are searched to detect a width of a used nozzle (S3005), and leftest/rightest ends of printing in all color planes (S3006) In other words, with respect to a scanning direction, positions of upstream and downstream ends are determined and the positional information of both is held.

As shown in the drawings, 50% of dot data for printing is generated in the P1 forward pass, and 50% of dot data for printing is generated in the P2 returning pass.

Next, data generation of the mask buffer will be described. In the case where mask compression is used in the 6-pass mode with respect to large and small nozzle rows of yellow (Y), magenta (M) and cyan (C), as shown in FIG. 10D1, a mask buffer of a 2-dimensional pattern constructed of 192 rasters is applied. 192 is the number of vertical color nozzles and 64 horizontal columns. The raster and the column are both data of 600 dpi units.

As shown in FIG. 10D2, the mask pattern is 50% duty. For the same nozzle block, extraction patterns of mask buffer data are complementary to each other. In FIG. 10D2, white circles (○) are used to indicate dots for which printing data is not transferred during the scanning this time, and black circles (●) are used to indicate dots for which printing data is transferred during the scanning this time.

For example, a mask A that is mask data for the nozzle block A and a mask D that is mask data for the nozzle block D are complementary to each other. As shown in FIG. 10D2, the black circles (●) part of the mask A is changed to white circles (○) in the mask D, and the white circles (○) part of the mask A is changed to black circles (●) in the mask D. Similar complementary relations apply between masks B and E, and between masks C and F.

As described above, a mask buffer (192 vertical rasters and 64 horizontal columns) is generated for 6 color planes (Y, M, C, y, m, and c) (S3007).

Next, various pointers such as a pointer (raster pointer) in a subscanning-direction indicating a processing position of a nozzle block (32 nozzle width), and a column pointer indicating a data processing position in a main scanning direction are initialized (S3009).

For example, first, processing of yellow (Y) is executed. The raster pointer indicates the nozzle block A when it is 0. The column pointer is initialized using a value corresponding to a position of a left end/right end of printing decided in the steps S3006 or S3008.

In the mode of executing multipass recording, the pointer is initialized using a value corresponding to the position of the left end/right end of printing decided in the step S3008. On the other hand, in the mode of executing 1-pass recording, the pointer is initialized using a value corresponding to the position of the left end/right end of printing decided in the step S3006.

As shown in FIGS. 10C1 and 10C2, data of 32 rasters×16 columns specified by a raster pointer and a column pointer is cut out from the intermediate buffer (S3010). As shown in FIGS. 10D1 and 10D2, data of 32 rasters×16 columns corresponding to a position of the intermediate buffer cut out from the mask buffer in the step S3010 is cut out (S3011).

As shown in FIG. 10E, only a black circles (●) part of the mask buffer is extracted from the printing data of the intermediate buffer to generate masked data, and it is stored in an output buffer for transmitting the printing data from the host PC to the printer (S3012). In other words, intermediate buffer data corresponding to a white circles (○) part of the mask buffer is thinned (reduced).

With respect to the six nozzle blocks (A to F), the process of the steps S3010 to S3014 is repeated. Accordingly, it is possible to generate printing data thinned (reduced) by 50% of 16 columns of the nozzle row width (192 nozzles).

For this process, the raster pointer is initialized, and the column pointer is updated by 16 columns (S3016). Then, for next 16 columns (downstream side in a scanning-direction), the process of the steps S3010 to S3014 is repeated. It is determined whether the process is completed with respect to all columns from the left end to the right end of printing (S3015). If completed, since the process is finished with respect to one color plane, the process proceeds to step S3017. If not completed, the process proceeds to step S3016 to process next 16 columns.

Next, with respect to the color plane of magenta (M), the process of the steps S3010 to S3016 is carried out. When the process of magenta (M) is completed, a process is similarly carried out for other colors.

It is determined whether processes for 6 color planes (S3017) are completed.

If the processes are completed for the six color planes, packbits compression is carried out for data stored in the output buffer (S3018). It is determined whether the packbits compression for the six color planes is completed (S3019). If it is completed, decoding data is generated in step S3020.

Next, a scanning information command containing information of the left end and right end positions of printing is transmitted (S3021), and a decoding information command for transmitting to the printer side the mask data that was used to compress each color plane, is transmitted (S3022).

Next, the decoding data generated in the step S3020 is transmitted (S3023). Then, the packbits-compressed data is repeatedly transmitted as a printing data command by one block unit (S3024). In S3025, the step S3024 is repeated until transfer for all the blocks ends.

When transfer for all the blocks is completed, a paper feeding command of 32 rasters is issued (S3026), and an area of the random index buffer that has stored the transferred data is opened (S3027).

Subsequently, when data in amount equal to one scanning is transferred to the ink jet printer, the process returns to the step S3001 to repeat the same processing.

The outline of the control flow of FIG. 11 has been described above.

In the case of 1-pass recording, the processes of the steps S3010 to S3017 are not carried out. It is because mask data compression is not executed. However, data is cut out by one block unit from the intermediate buffer, and packbits compression is carried out in the step S3018. This process is carried out for all the color planes.

[Supplement]

A supplement to the above process will be given.

In FIGS. 10C2, 10D2, and 10E, in order to simplify the explanation of the mask compression, it is presumed that there is no difference in the scanning direction between the data generation for printing at the nozzle block A of the forward pass in the P1 scanning and the data generation for printing at the nozzle block D of the backward-pass in the P4 scanning.

Figure 12:
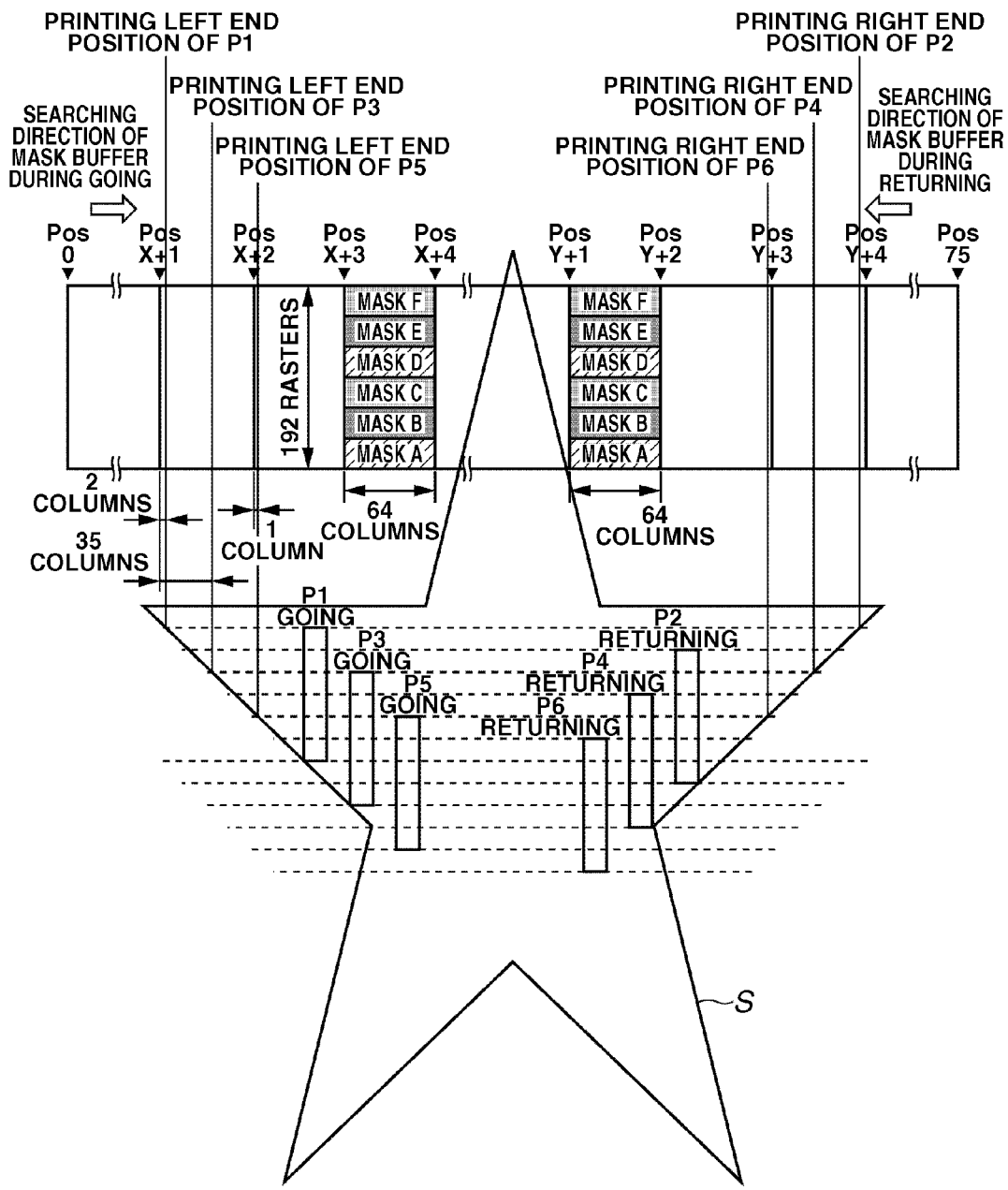
FIG. 12 is an explanatory diagram of a positional relation between a printing left end/right end and a mask according to an exemplary embodiment of the present invention.

FIG. 12 shows a positional relation between an image S recorded on a recording sheet and the left end/right end of printing of the recording head for recording the star-shaped image S.

FIG. 12 is a virtual explanatory diagram where a recording buffer disposed in the recording apparatus to store recording data of one scanning, and a scanning area of the recording head are correlated with each other in an upper side of the star-shaped image S.

As described above with reference to FIG. 6, according to the exemplary embodiment, a capacity of the recording buffer disposed in the ink jet printer is smaller than a data amount used in recording by one scanning. However, FIG. 12 is meant to facilitate understanding of a relation among a recording position (column position) on the recording medium in a scanning direction, a stored state (address of recording buffer) in the recording buffer, and mask data.

FIG. 12 is an explanatory diagram of scanning carried out 6 times (P1 to P6 indicate start positions of scanning) in the case of forming the image S on the recording medium. For example, in the first scanning (P1), scanning is carried out in a first direction (e.g., right direction), to record data. In the case of the second scanning (P2), scanning is carried out in a second direction (e.g., left direction), to record data. Accordingly, the drawing shows recording in both directions. In FIG. 12, recording sheets are transported. However, in order to simplify explanation, the recording head is shifted in a transporting direction.

According to the exemplary embodiment, 2-dimensional mask data of 192 rasters×64 columns is repeatedly applied by 64 column units from an address Pos0 of the buffer corresponding to a printable leftest end to an address Pos75 (in the case of a maximum printing width of 8 inches) corresponding to a printable rightest end.

In other words, irrespective of presence of data, it corresponds to the position (column position) of the scanning direction on the recording medium. This is for the purpose of maintaining alignment between the scanning and transporting directions.

In the case of executing mask compression, mask data corresponding to a printing data position is picked up from the mask buffer and subjected to mask compression. The mask-compressed printing data is transferred from the host apparatus to the printer before scanning is started. The mask data used for the mask compression serves as decoding data. Mask rasterization (restoration from mask compression) is carried out based on the mask-compressed printing data and the decoding data at the printer.

If the exemplary embodiment is not applied, information may be required to indicate what column of the mask buffer (decoding buffer on the printer main body side) a printing start position corresponds, i.e., offset information. As described above, the data generation of the mask buffer can be changed according to a scanning direction, which further complicates management of the offset information. For example, as long as there is a decoding buffer capable of holding six patterns that can be set completely independently for color planes (6 color planes in this case), offset information can be omitted. In this case, however, the number of gates for ASIC is increased on the printer main body side.

Thus, according to the exemplary embodiment, in the mode of applying mask compression, by dividing (rounding) the printing start position into areas corresponding to sizes of the mask buffer, the necessity of transmitting the offset information from the host apparatus to the printer can be eliminated. Moreover, it is possible to simplify control process at the host apparatus or the printer.

Figure 13:
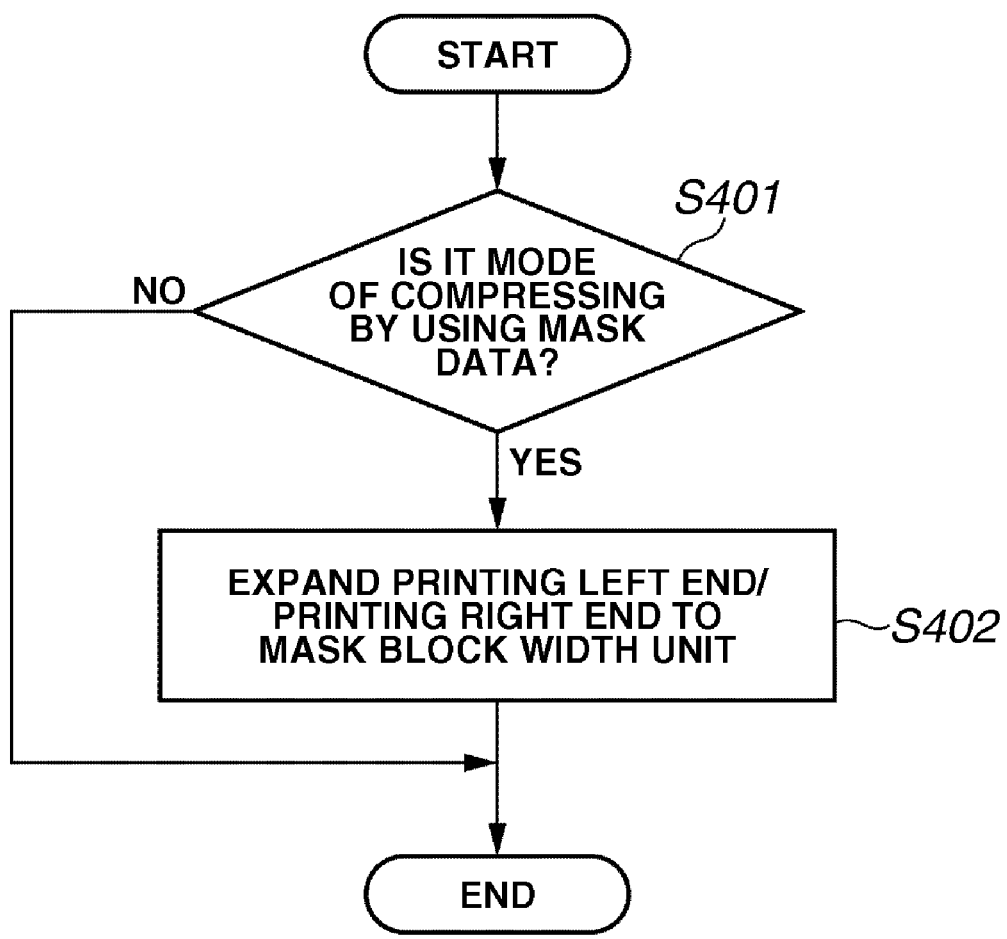
FIG. 13 is a flowchart showing a control flow according to an exemplary embodiment of the present invention.

A determination whether to execute this rounding process is shown in a control flow of FIG. 13. In step S401, it is determined whether a recording mode is a mode that uses mask data. If Yes in the step S401, an end position in a scanning direction in a printing area (upstream or downstream end, left or right end in a moving direction of the recording head in the printing area) is changed (rounded) (S402).

To use an expression regarding a reading process of the recording buffer, a reading start address of the recording buffer corresponding to the end position in the scanning direction in the printing area is changed. The change of the reading start address is realized by aligning the reading start position with a division address position of the mask buffer.

When the reading start position is aligned with the division address position of the mask buffer, for example, a storage position of recording data in FIG. 12 should be included.

On the other hand, if No in the step S401, the end position is not changed (rounded). A rounding method for the printing start position is switched according to a scanning direction as shown in FIG. 12. For example, in the case of printing of the forward-pass scanning indicated by P1 in FIG. 12, a left end position of original printing (start position) is advanced by 2 columns (to the right side by 2 columns in the drawing) from PosX+1 which is a division position of 64 columns of the mask buffer. This position, i.e., the left end position of printing in the forward-pass scanning of P1, is changed to PosX+1 (to the left side in the drawing). In the case of printing in the backward-pass scanning of P2, the right end position of printing (start position) shown in the drawing is changed to PosY+4 (to the right side in the drawing).

Through this change, mask data can always be taken out (read) from the head column of the mask buffer, thereby eliminating the necessity of managing an offset amount.

Though a scanning width of the recording head is increased by an amount equal to two columns, the additional time can be fully ignored in the multipass printing mode in which an image is formed through six passes.

For example, when a printing speed is required in a printing mode of plain paper where mask compression is not applied, the rounding of the mask buffer by column width (64 columns) units in the step S3008 is not executed.

Next, the raster pointer will be described. The raster pointer manages a data pickup position in a subscanning direction from the intermediate buffer and the mask buffer. When the raster pointer is 0, it indicates a raster position for the nozzle block A (32 nozzles counted from the paper feeding side). When the raster pointer is 160 which is an end value, it indicates a raster position for the nozzle block F (32 nozzles from the nozzle block E).

Now, the column pointer will be described. The column pointer indicates a left end position of printing when scan-recording that is going to be executed, is forward-direction printing. The column pointer indicates a right end position of printing when scan-recording to be executed, is backward-direction printing.

In the printing mode where the printing start position is changed, null data (zero data) equivalent to a changing amount (column amount) is generated. In other words, when block data containing the end point for printing start is generated, the null data is inserted into a head of data corresponding to the printing start point.

The column pointer indicates a pickup position of the mask buffer in a main scanning direction. Since the mask is repeated by the 64-column cycle as described above, and a column position is indicated by a remainder where the column pointer is divided by 64 which is a column width of the mask buffer. Accordingly, the column position indicates a data pickup position from the mask buffer in the main scanning direction.

The output buffer is disposed for each color. With respect to the output buffer of one color, 256-bit data which is data thinned (reduced) by 50% from 512 bits of 16 columns×32 rasters, are repeatedly stored in order of the nozzle blocks A to F. Data of 192 nozzles×64-column width is stored. This data unit is a unit of one block.

Accordingly, in packbits compression, data of 192 nozzles×64 columns is picked up and subjected to packbits compression for the output buffer of a first color. Next, data equivalent to 192 nozzles×64 columns is obtained from the output buffer of a second color and subjected to packbits compression. This process is carried out until data of a sixth color is processed. Then, as in the case of the reception data structure of FIGS. 8A to 8C, a color change code is added to an end of each color data which was subjected to the packbits compression. By repeating this process, data of blocks which are used for one scan-recording, is generated.

Next, generation of decoding data will be described. By using the mask data generated in the step S3007, decoding data denoted by 1029 of FIG. 8C is generated. According to the exemplary embodiment, in the case of the six-pass mode where thinning (data reducing) by mask compression is applied, first to sixth colors are respectively defined to be cyan (large), cyan (small), magenta (large), magenta (small), yellow (large), and yellow (small). A pattern 0 is commonly used for large and small for cyan mask data, a pattern 1 is commonly used for large and small for magenta mask data, and a pattern 2 is commonly used for large and small for yellow mask data.

As described above, the data thinning (reduction) by the mask compression is repeated from the nozzle A to the nozzle F by 16 columns×32 nozzles to generate the data. Therefore, in order to generate decoding data from the mask buffer, similarly, the process is repeated from the nozzle A to the nozzle F by 16 columns×32 nozzles, which prepares for generating data of totally 64 columns as one decoding data.

Thus, the process of generating the data used for the scan-recoding is finished. Subsequently, a process of transmitting a command or data from the host apparatus to the printer is carried out.

The decoding data in FIG. 8C will be described. In FIG. 8C, a first color decoding pattern 1034 and a second color decoding pattern 1035 are the pattern 0. Third and fourth color decoding patterns are the pattern 1. Fifth and sixth decoding patterns are the patterns 2.

As the pattern 0 denoted by 1037 in FIG. 8C, data of 192 rasters×64 columns which is mask data used for cyan mask compression, is transferred. Similarly, mask data used for magenta mask compression and mask data used for yellow mask compression are respectively transferred as the pattern 1 denoted by 1038 and the pattern 2 denoted by 1039.

Opening of the random index buffer will be described. For example, when data of 32 rasters generated this time is N-th in the random index buffer of FIG. 10A, it is a buffer of N-5 that is opened. This random index buffer has a ring buffer structure, and used for processing next data of 32 rasters.

Other Exemplary Embodiments

The exemplary embodiment has been described by taking both-direction recording (forward-pass recording and backward-pass recording) as an example for the recording operation of the recording apparatus. However, the invention can be applied to one-direction recording. Referring to FIG. 12, when the recording head executes recording of forward-pass scanning alone, it is only necessary to round the left end.

The number of columns of the master block is not limited to 64. For example, it can be 128 or 32.

The number of columns per block of recording data transferred from the host to the printer is not limited to 64. For example, it can be 128 or 256.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-199966 filed Jul. 8, 2005, which is hereby incorporated by reference herein in its entirety.

What is claimed is:

1. An information processing apparatus capable of connecting to a recording apparatus which scans an area of a recording medium with a recording head a plurality of times, wherein the recording apparatus receives block data from the information processing apparatus, the information processing apparatus comprising:

a first buffer to store multi-valued data included in an image;

a second buffer to store dot data to be recorded by one scanning of the recording head;

a dot data generating unit configured to read the multi-valued data from the first buffer, generate the dot data by using a pattern for generating dot data and store generated dot data in the second buffer for a predetermined amount of columns;

an obtaining unit configured to obtain a first column position corresponding to an upstream end of the dot data stored in the second buffer with respect to a scanning direction of the recording head by searching the dot data stored in the second buffer and obtain a second column position which is located at an upper-stream side relative to the first column position and corresponds to an integral multiple of the predetermined amount of columns;

a null data generating unit configured to generate null data having an amount of columns based on a difference between the first column position and the second column position;

a reading unit configured to read data from the second buffer based on the second column position;

a first compression unit configured to input the null data and data read from the reading unit and compress the input data by using a pattern for thinning dot data;

a second compression unit configured to compress the data compressed by the first compression unit for the predetermined amount of columns; and an output unit configured to output the second compressed data compressed by the second compression unit as the block data to the recording apparatus.

2. The information processing apparatus according to claim 1, further comprising a third buffer configured to store a pattern for thinning dot data.

3. The information processing apparatus according to claim 2, wherein a column width of the third buffer corresponds to the predetermined amount of columns.

4. The information processing apparatus according to claim 1, wherein the data stored in the first buffer includes multiple values per pixel.

5. A method operating in an information processing apparatus that is capable of connecting to a recording apparatus which scans an area of a recording medium with a recording head a plurality of times, wherein the recording apparatus receives block data from the information processing apparatus, the method comprising:

first storing in a first buffer, multi-valued data included in an image;

second storing in a second buffer, data to be recorded by one scanning of the recording head;

reading the multi-valued data read from the first buffer;

generating dot data by using a pattern for generating dot data;

third storing dot data in the second buffer for a predetermined amount of columns;

searching the dot data stored in the second buffer;

obtaining a first column position corresponding to an upstream end of the dot data stored in the second buffer with respect to a scanning direction of the recording head based on a result of the searching and a second column position which is located at an upper-stream side relative to the first column position based on the first column position and corresponds to an integral multiple of the predetermined amount of columns;

generating null data having an amount of columns based on a difference between the first column position and the second column position;

reading data from the second buffer based on the second column position;

combining the null data with the data read from the second buffer based on the second column position;

first compressing the combined data by using a pattern for thinning dot data to generate first compressed data;

second compressing the first compressed data to generate second compressed data for the predetermined amount of columns; and outputting the second compressed data as the block data to the recording apparatus.

* * * * *